(12) United States Patent
Miyamoto et al.

(10) Patent No.: US 6,968,864 B2
(45) Date of Patent: **\*Nov. 29, 2005**

(54) ROTARY HOLDER FOR CORRUGATED TUBE

(75) Inventors: Masaji Miyamoto, Shizuoka (JP); Ryoichi Fukumoto, Aichi-ken (JP)

(73) Assignees: Yazaki Corporation, Tokyo (JP); Aisin Seiki Kabushiki Kaisha, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/292,444

(22) Filed: Nov. 13, 2002

(65) Prior Publication Data

US 2003/0111579 A1    Jun. 19, 2003

(30) Foreign Application Priority Data

Nov. 14, 2001 (JP) .............................. 2001-348926

(51) Int. Cl.[7] .............................................. F16L 11/00
(52) U.S. Cl. ..................... 138/110; 138/157; 138/114; 138/108; 248/74.4; 285/419
(58) Field of Search ............................. 248/67.5, 74.4, 248/65, 49, 70, 71, 73; 285/419, 373; 138/108, 138/113, 110, 156, 157

(56) References Cited

U.S. PATENT DOCUMENTS

| | | | | |
|---|---|---|---|---|
| 1,499,954 A | * | 7/1924 | Stiles ........................ | 138/157 |
| 3,295,806 A | * | 1/1967 | Modeme .................... | 248/74.4 |
| 3,329,455 A | * | 7/1967 | Becker et al. ............... | 403/76 |
| 3,458,163 A | * | 7/1969 | Egerton-Smith ........... | 248/67.5 |
| 3,711,632 A | * | 1/1973 | Ghirardi .................... | 174/135 |
| 3,851,979 A | * | 12/1974 | Becker ....................... | 403/76 |

(Continued)

FOREIGN PATENT DOCUMENTS

| DE | 3827662 A1 | * | 2/1990 |
|---|---|---|---|
| JP | 11008922 | | 1/1999 |

(Continued)

*Primary Examiner*—Ramon O Ramirez

(74) *Attorney, Agent, or Firm*—Finnegan, Henderson, Farabow, Garrett & Dunner, L.L.P.

(57) ABSTRACT

A rotary holder for a corrugated tube is structured such that an inner rotary body containing a corrugated tube is received in an inner portion of an outer fixing body, and an outer peripheral sliding surface of the inner rotary body slides along an inner sliding surface of the outer fixing body. The outer fixing body is formed by assembling a base member and a cover each having a recessed arch surface on an inner periphery thereof. The inner sliding surface is formed by connecting a recessed arch surface of the base member to a recessed arch surface of the cover. Further, outer retracting surfaces are respectively provided to both end portions of the recessed arch surface of the base member so as to be extended to a tangential direction thereat.

11 Claims, 13 Drawing Sheets

U.S. PATENT DOCUMENTS

| | | | |
|---|---|---|---|
| 4,750,841 A * | 6/1988 | Hicks ........................... 366/79 |
| 4,919,462 A * | 4/1990 | Matsui et al. ............ 285/149.1 |
| 5,480,193 A * | 1/1996 | Echols et al. ................. 285/45 |
| 5,979,839 A * | 11/1999 | Horn et al. ................... 248/71 |
| 6,053,749 A | 4/2000 | Masuda et al. |
| 6,085,795 A | 7/2000 | Ogawa et al. |
| 6,105,216 A * | 8/2000 | Opperthauser ............... 24/459 |
| 6,561,466 B1 * | 5/2003 | Myers et al. .............. 248/74.4 |
| 6,668,865 B2 * | 12/2003 | Miyamoto et al. .......... 138/108 |
| 6,717,055 B2 * | 4/2004 | Kato ........................ 174/72 A |
| 6,732,764 B2 * | 5/2004 | Miyamoto et al. .......... 138/110 |
| 6,761,189 B2 * | 7/2004 | Berninger et al. .......... 138/157 |
| 2002/0000499 A1 * | 1/2002 | Aoki et al. ................. 248/74.4 |

FOREIGN PATENT DOCUMENTS

JP    2000002364    1/2000

* cited by examiner

ROTARY HOLDER FOR CORRUGATED TUBE

BACKGROUND OF THE INVENTION

1. Field of the Invention

The present invention relates to a rotary holder for a corrugated tube holding rotatably a corrugated tube in which a wire harness is received.

2. Description of the Related Art

A rotary holder for a corrugated tube as shown in FIGS. 1 to 5 has been known conventionally. A rotary holder device for a corrugated tube 1, as shown in FIGS. 1 to 2, is composed of an outer fixing body 2 and an inner rotary body 3 received rotatably in an inner portion of the outer fixing body 2. A corrugated tube 4 containing a wire harness W therein is held in an inner portion of the inner rotary body 3.

As shown in FIGS. 1 to 3, the outer fixing body 2 is formed by butting a butt surface 5b of a base member 5 against a butt surface 6b of a cover 6. An inner rotary chamber 8 surrounded by an inner sliding surface 7 is formed in an inner portion of the outer fixing body 2. Further, the inner sliding surface 7 is formed by a recessed arch surface 5a of the base member 5 and a recessed arch surface 6a of the cover 6.

Further, as shown in FIGS. 1 and 4, the inner rotary body 3 is composed of two semi-cylindrical divided rotary members 9, 9 each of which has a round arch surface on an outer periphery thereof. The inner rotary body 3 is formed by butting a butt surface 9b of one divided rotary member 9 against a butt surface 9b of the other divided rotary member 9. Further, a round outer peripheral sliding surface 10 is formed by assembling a round arch surface 9a of one divided rotary member 9 onto a round arch surface 9a of the other divided rotary member 9 without generating a step. The outer peripheral sliding surface 10 of the inner rotary body 3 moves sliding along the inner sliding surface 7 of the outer fixing body 2, whereby the inner rotary body 3 rotates in the inner portion of the outer fixing body 2. On the basis of the structure mentioned above, the corrugated tube 4 is rotatably held by the rotary holder for the corrugated tube 1.

However, since the outer fixing body 2 in the conventional rotary holder for the corrugated tube 1 is composed of the base member 5 and the cover 6 for the purpose of receiving the inner rotary body 3 in the inner portion thereof, it has been liable to occur that the butt surface 5b of the base member 5 may displace from the butt surface 6b of the cover 6 due to a failure of a lock means 11, 11 provided between the base member 5 and the cover 6, and due to an outward force applied to the base member 5 and the cover 6 as shown in FIG. 5. Once a displacement is generated between the butt surfaces 5b, 6b, a step portion is generated in a portion at which the recessed arch surface 6a of the cover 6 has been smoothly connected to the recessed arch surface 5a of the base member 5. Under this state, when the inner rotary body 3 rotates in the inner portion of the outer fixing body 2, a diameter of an inner sliding surface 7 of the outer fixing body 2 is substantially reduced at an amount of displacement d2. Therefore, the inner rotary body 3 can not smoothly rotate in the inner portion of the outer fixing body 2.

Further, in the case that the corrugated tube 4 receiving the wire harness W largely swings around the inner rotary body 3, the corrugated tube 4 is easily bent in an opening portion of the outer fixing body 2 for receiving the corrugated tube 4. In some cases, it has also been liable to occur that the corrugated tube 4 and a plurality of electric wires constituting the wire harness W are damaged.

SUMMARY OF THE INVENTION

It is an object of the present invention to provide a rotary holder for a corrugated tube wherein an inner rotary body can always move smoothly on an inner sliding surface of an outer fixing body even in the case that a displacement is generated in each of butt surface between a plurality of divided fixing members, and can securely prevent the corrugated tube and inner electric wires from being damaged.

In order to achieve the object mentioned above, the present invention provides a rotary holder for a corrugated tube comprising: an outer fixing body constituted by two or more divided fixing members each having a recessed arch surface in an inner periphery thereof, and having an inner rotary chamber surrounded by an round inner sliding surface which is formed from the recessed arch surfaces by butt surfaces of the two or more divided fixing members being butted against and assembled onto one another; and an inner rotary body having an outer peripheral sliding surface which moves sliding along the inner sliding surface of the outer fixing member, in an outer periphery thereof, and receiving the corrugated tube; wherein in each of some divided fixing members, outer retracting surfaces are respectively provided to both end portions of recessed arch surface thereof so as to be positioned outside a virtual circular locus of the recessed arch surface, and, in each of other divided fixing members, a length between both leading edges of recessed arch surface thereof is set so as to coincide with a length between both leading edges of the outer retracting surface.

In order to achieve the object mentioned above, the present invention provides a rotary holder for a corrugated tube comprising: an outer fixing body constituted by two or more divided fixing members each having a recessed arch surface in an inner periphery thereof, and having an inner rotary chamber surrounded by an round inner sliding surface which is formed from the recessed arch surfaces by butt surfaces of the two or more divided fixing members being butted against and assembled onto one another; and an inner rotary body having an outer peripheral sliding surface which moves sliding along the inner sliding surface of the outer fixing member, in an outer periphery thereof, and receiving the corrugated tube; wherein a guide for keeping a curvature of the corrugated tube is formed in an introduction side of the outer fixing body, and a curved wall substantially shaped like circular arc along which the corrugated tube 23 is guided outward is formed in the guide.

DESCRIPTION OF THE PREFERRED EMBODIMENTS

Figure 1:
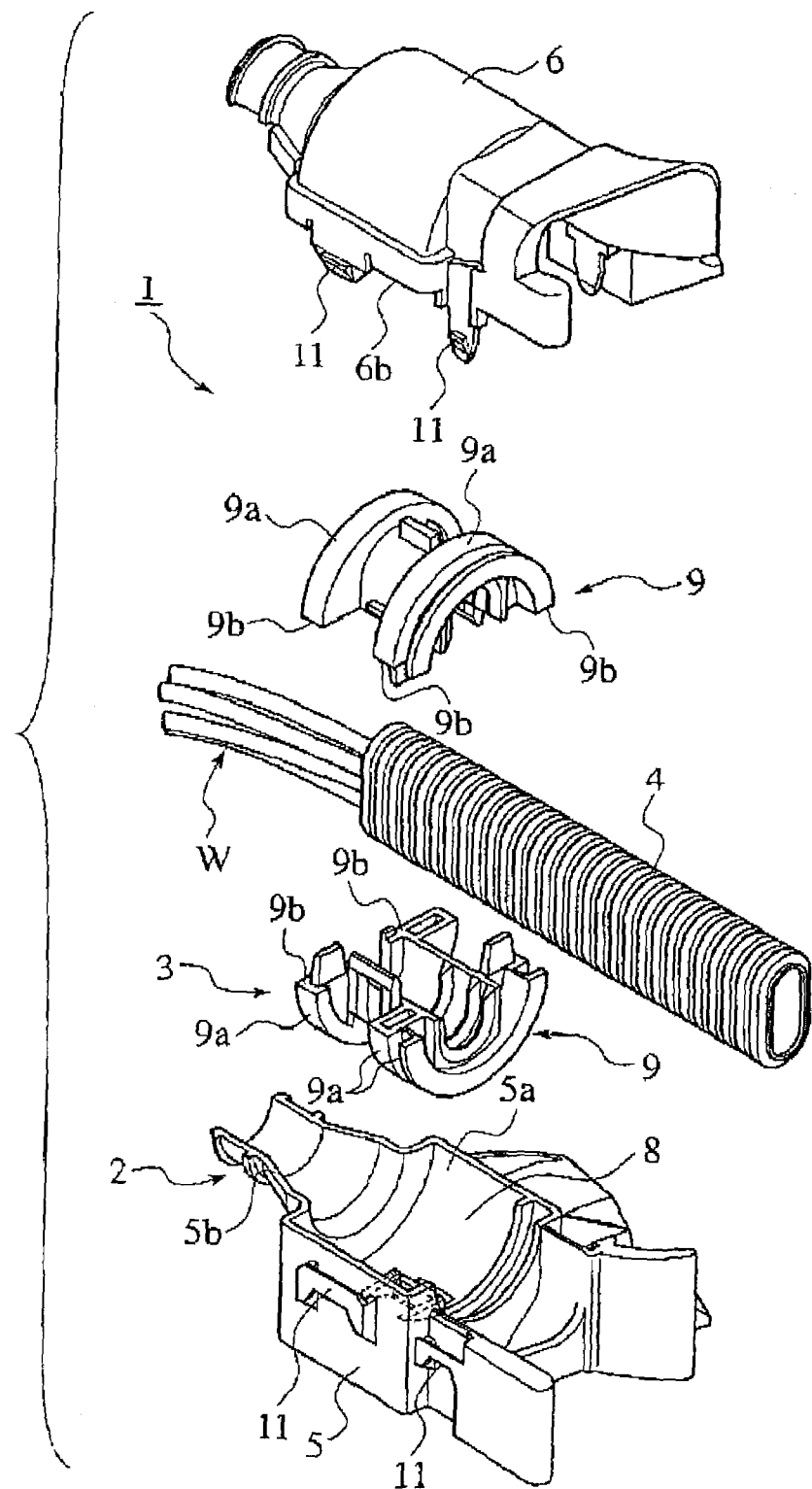
FIG. 1 is an exploded perspective view of a rotary holder for a corrugated tube according to a conventional embodiment.

In the following, an embodiment of the present invention will be explained on the basis of the drawings.

As shown in FIGS. 6 to 11, a rotary holder 20 for a corrugated tube is composed of an outer fixing body 21, and an inner rotary body 22 received rotatably in an inner portion of the outer fixing body 21. A corrugated tube 23 made of a rubber or the like and containing a wire harness W is held in an inner portion of the inner rotary body 22.

The outer fixing body 21 is composed of a base member 24 made of synthetic resin and a cover 25 made of synthetic resin. The outer fixing body 21 is formed by attaching the cover 25 onto the base member 24. The base member 24 has a lower reception case portion 28 which forms a lower half of an inner rotary chamber 27 mentioned below. An upper end surface of the lower reception case portion 28 corresponds to a butt surface 28a. A recessed arch surface 28b is formed in an inner surface of the lower reception case portion 28. Further, the cover 25 has an upper reception case portion 30 which forms an upper half of the inner rotary chamber 27 mentioned below. An inner lower end surface of the upper reception case portion 30 corresponds to a butt surface 30a. A recessed arch surface 30b is formed in an inner surface of the upper reception case portion 30.

Accordingly, the cover 25 is assembled onto the base member 24 by butting the butt surface 30a of the cover 25 against the butt surface 28a of the base member 24. Further, the upper reception case portion 30 is also assembled onto the lower reception case portion 28 simultaneously, whereby the inner rotary chamber 27 surrounded by the round inner sliding surface 26 is formed. Moreover, two guides 43, 43 in which the corrugated tube 23 protrudes in a direction extending outward (in the direction of Z-axis, as shown FIG. 6) are formed in the cover 25.

Figure 2:
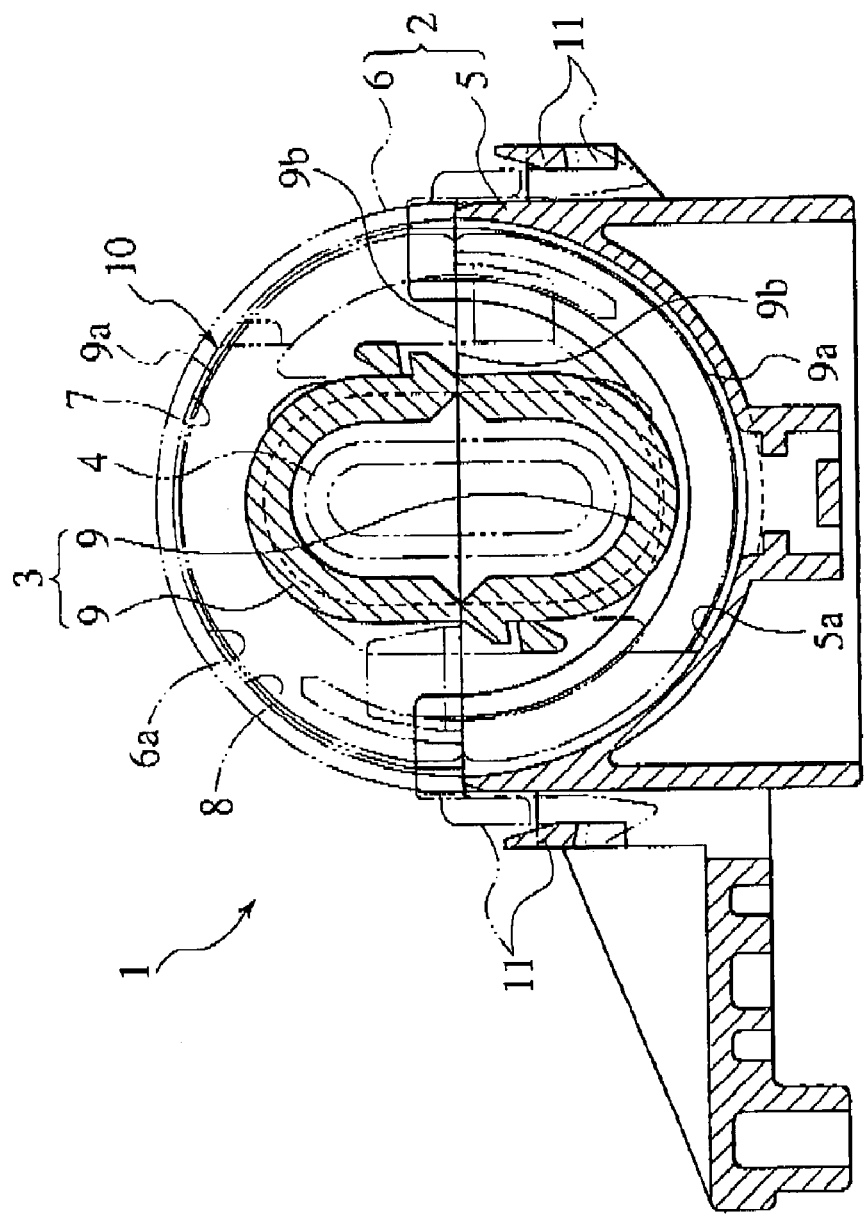
FIG. 2 is a cross sectional view of the rotary holder for the corrugated tube according to the conventional embodiment.
Figure 3:
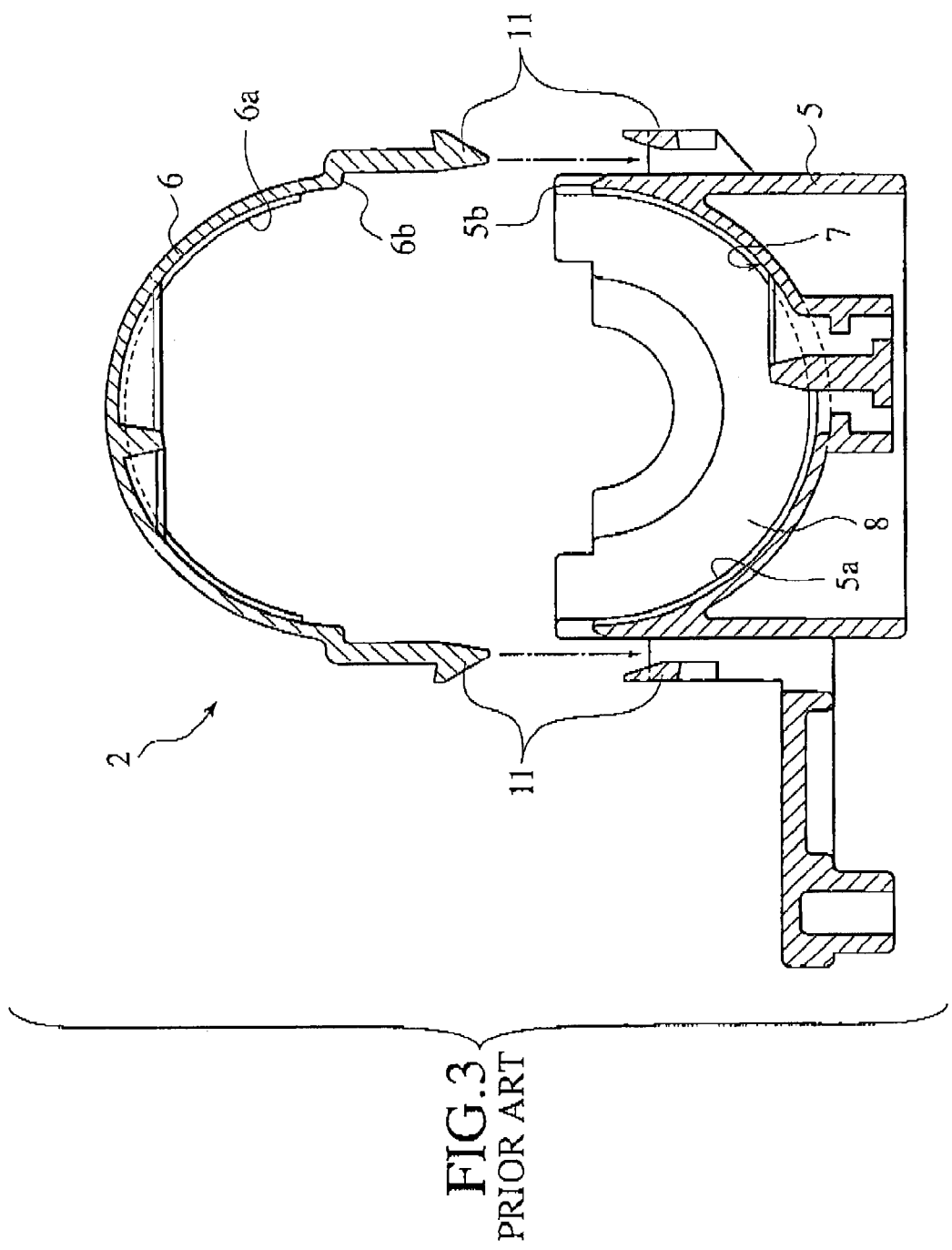
FIG. 3 is an exploded cross sectional view of an outer fixing body according to the conventional embodiment.
Figure 4:
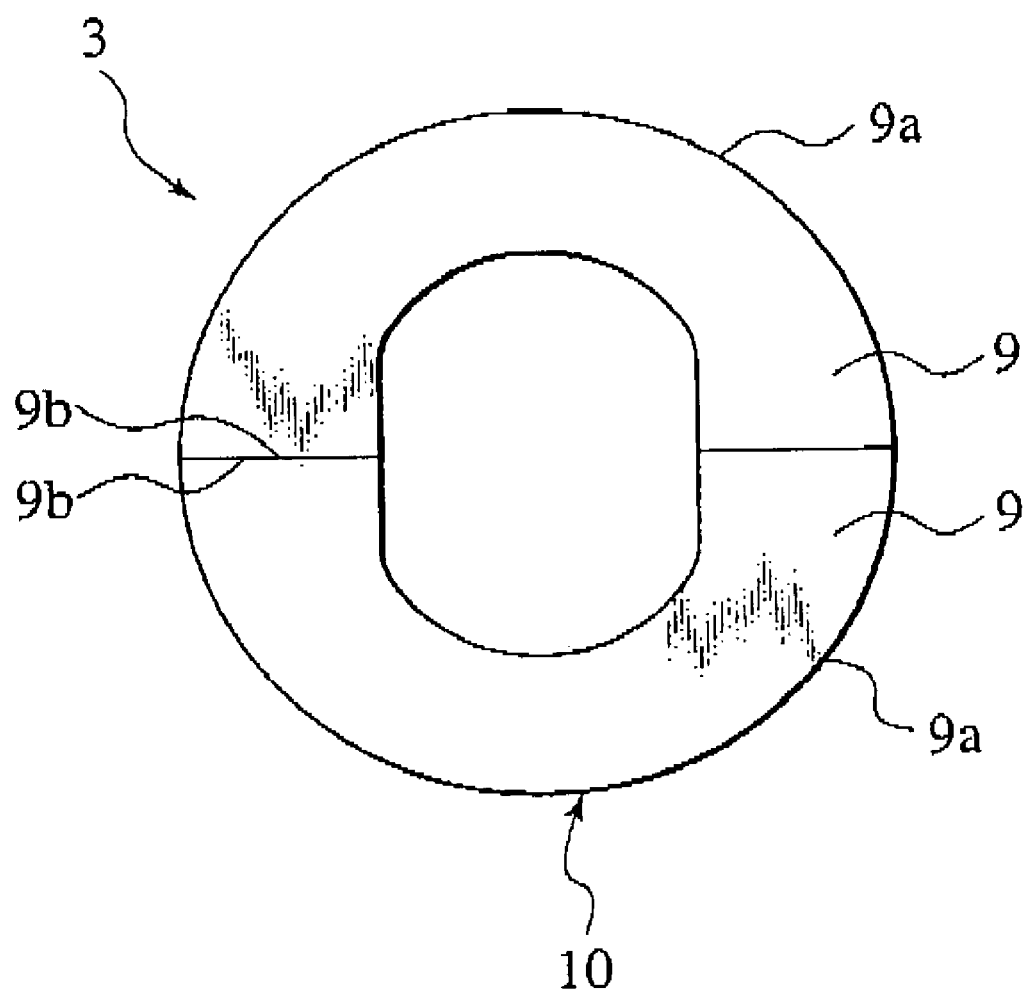
FIG. 4 is a schematic front elevational view of an inner rotary body according to the conventional embodiment.
Figure 5:
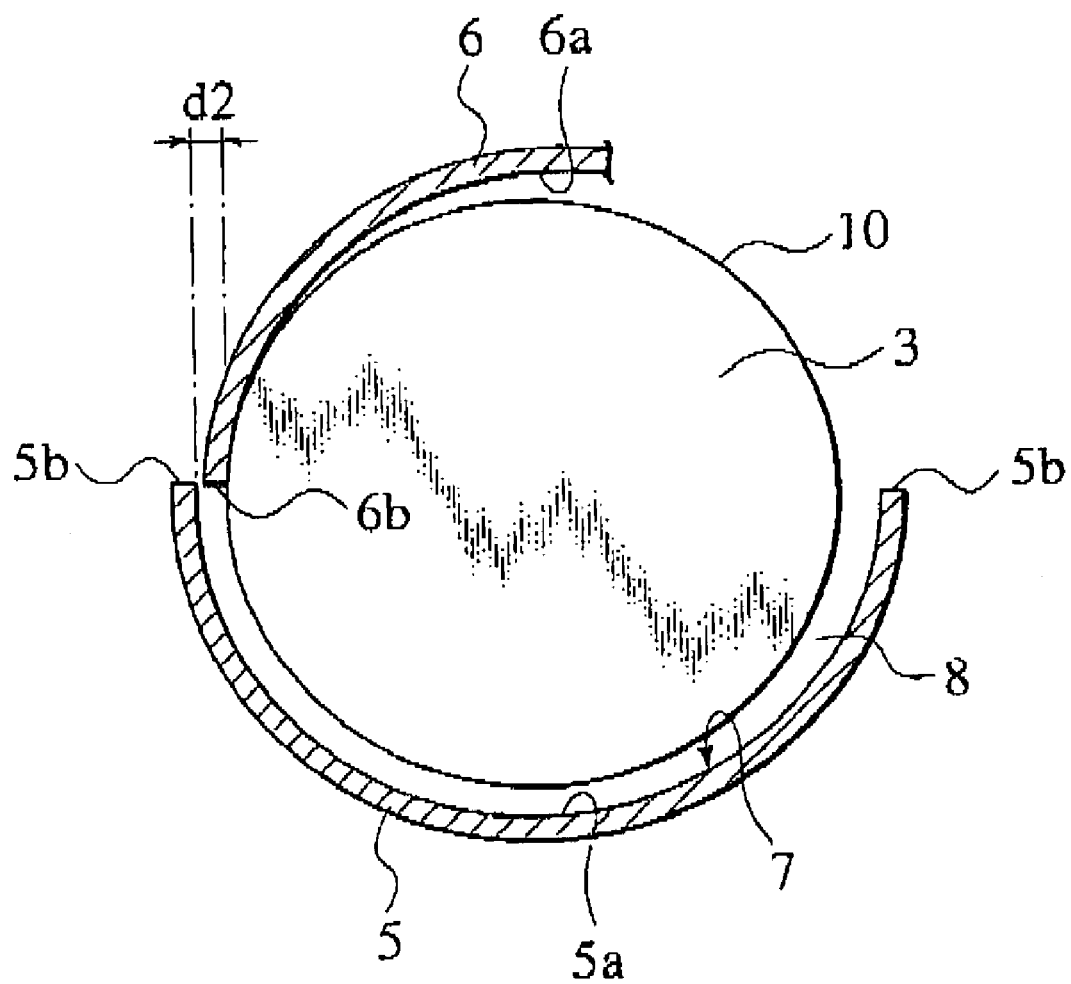
FIG. 5 is a partly schematic front elevational view showing a state in which respective butt surfaces are displaced between a base member and a cover according to the conventional embodiment.
Figure 12:
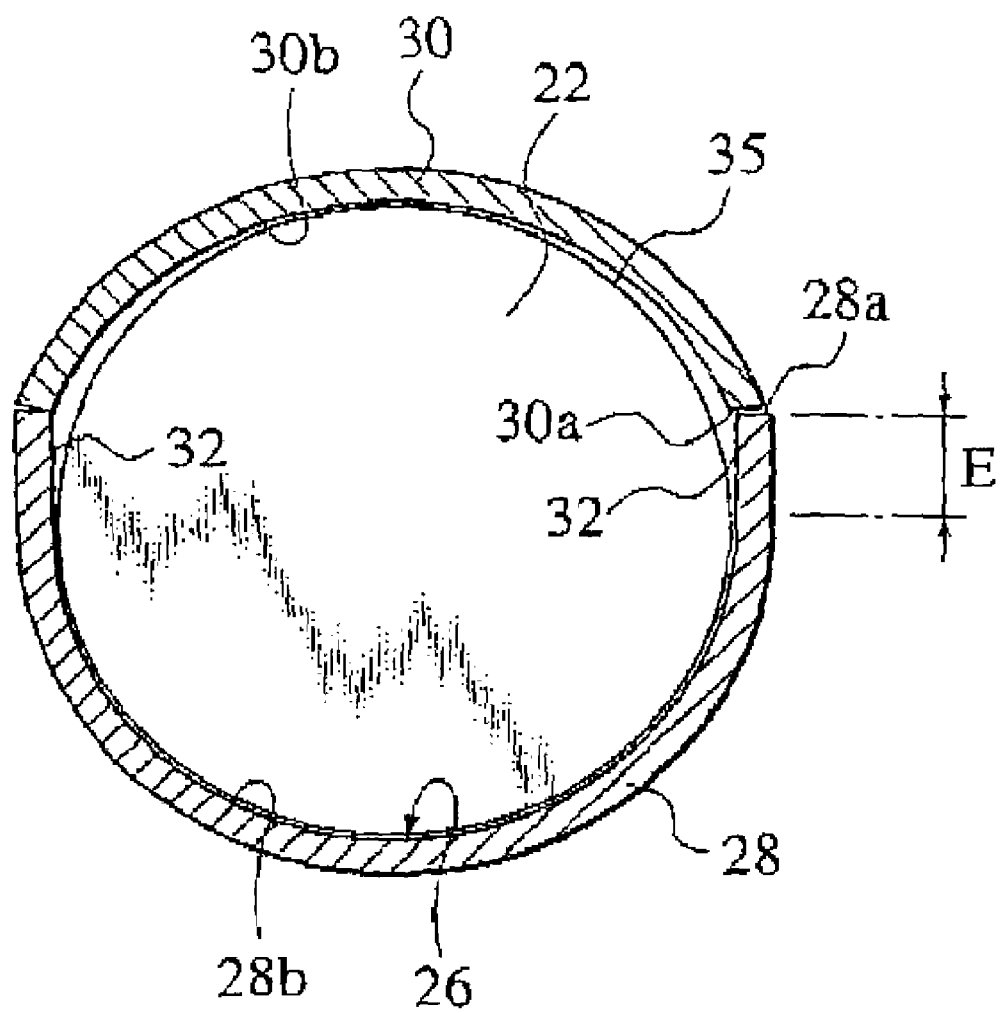
FIG. 12 is a schematic cross sectional view of the outer fixing body according to the embodiment of the present invention.

Further, outer retracting surfaces 32, 32 are respectively provided to both end portions of the recessed arch surface 28b of the base member 24 so as to be straightly extended upward. More concretely, as shown FIG. 13, the outer retracting surface 32, 32 are positioned outside a virtual circular locus c supposed by sectioning the recessed arch surface 28b in the vertical direction (in the direction Y-axis, as shown FIG. 6). In the present embodiment, as shown in FIGS. 7 and 12, the outer retracting surface 32 is straightly extended upward from the end portion of the recessed arch surface 28b by an amount E. That is, the outer retracting surface 32 is provided to the end portion of the recessed arch surface 28b so as to be extended upward by the amount E in a tangential direction of the recessed arch surface 28b thereat. Accordingly, the butt surfaces 28a, 28a of the lower reception case portion 28 are most apart from the virtual circular locus c. The butt surfaces 30a, 30a of the upper reception case portion 30 are formed so as to respectively coincide with the butt surfaces 28a and 28a of the lower reception case portion 28. That is, since a distance between the butt surfaces 28a, 28a is set to be larger than diameter of the virtual circular locus c, a distance between the butt surfaces 30a and 30a is also set to be larger than a diameter of the virtual circular locus c. According to the structure mentioned above, as shown FIG. 7, the butt surfaces 30a, 30a are respectively butted against the butt surfaces 28a, 28a at positions above the center of curvature of the recessed arch surface 28b in the base member 24 (at positions above conventional positions (as shown FIG. 2) where a butt surfaces 6b, 6b are respectively butted against the butt surfaces 5b, 5b, by the amount E).

Figure 6:
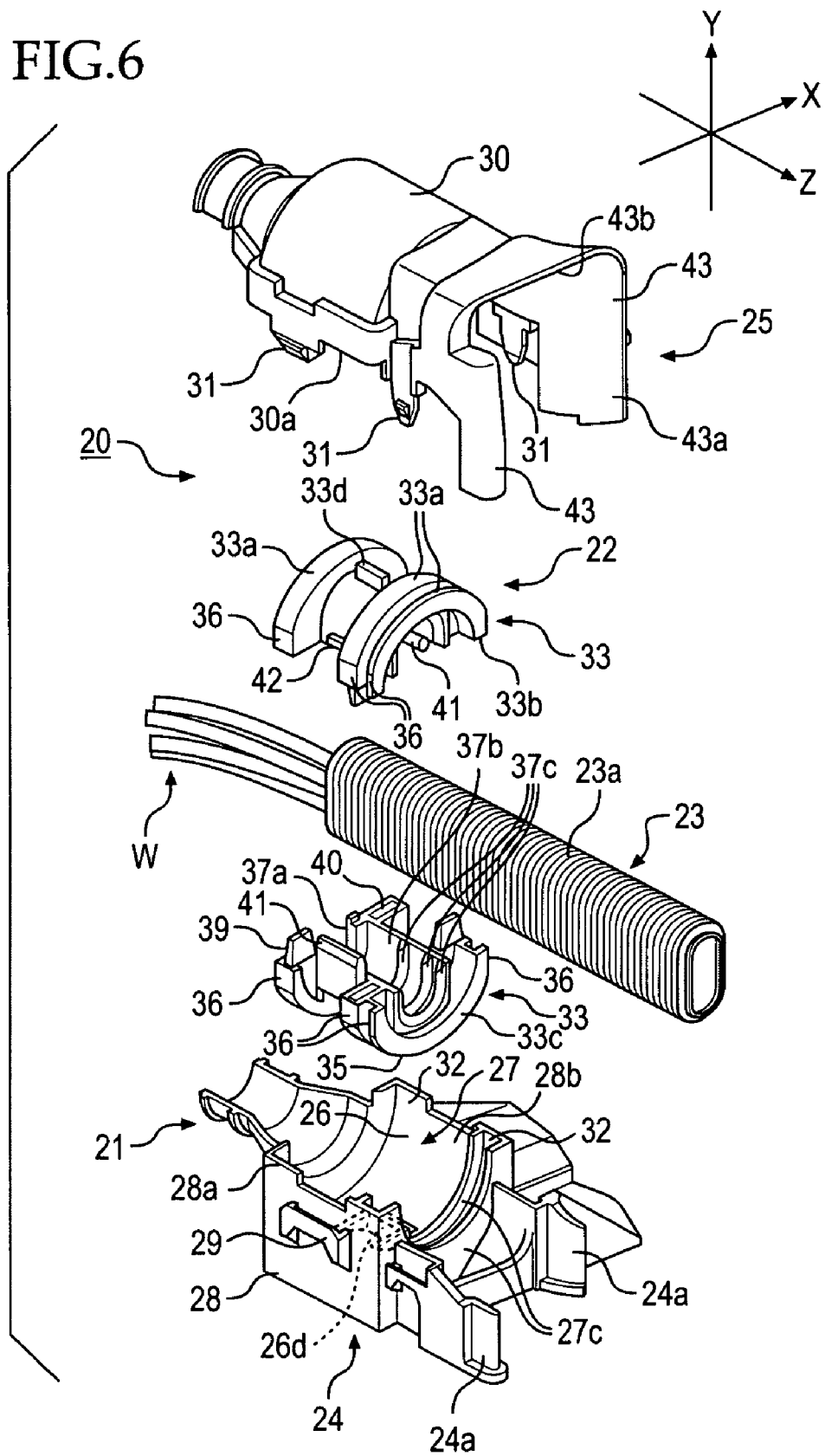
FIG. 6 is an exploded perspective view of a rotary holder for a corrugated tube according to an embodiment of the present invention.
Figure 7:
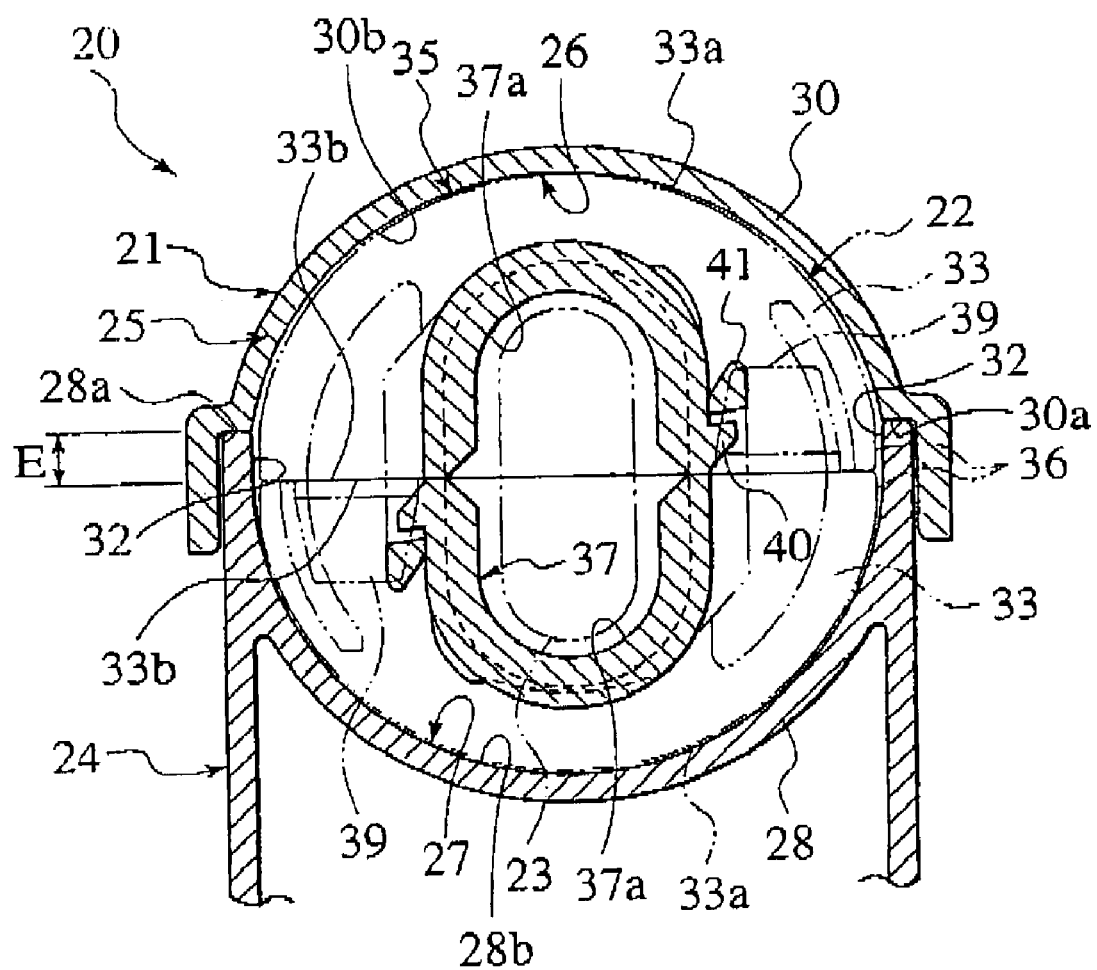
FIG. 7 is a cross sectional view of a main portion of the rotary holder for the corrugated tube according to the embodiment of the present invention.
Figure 8:
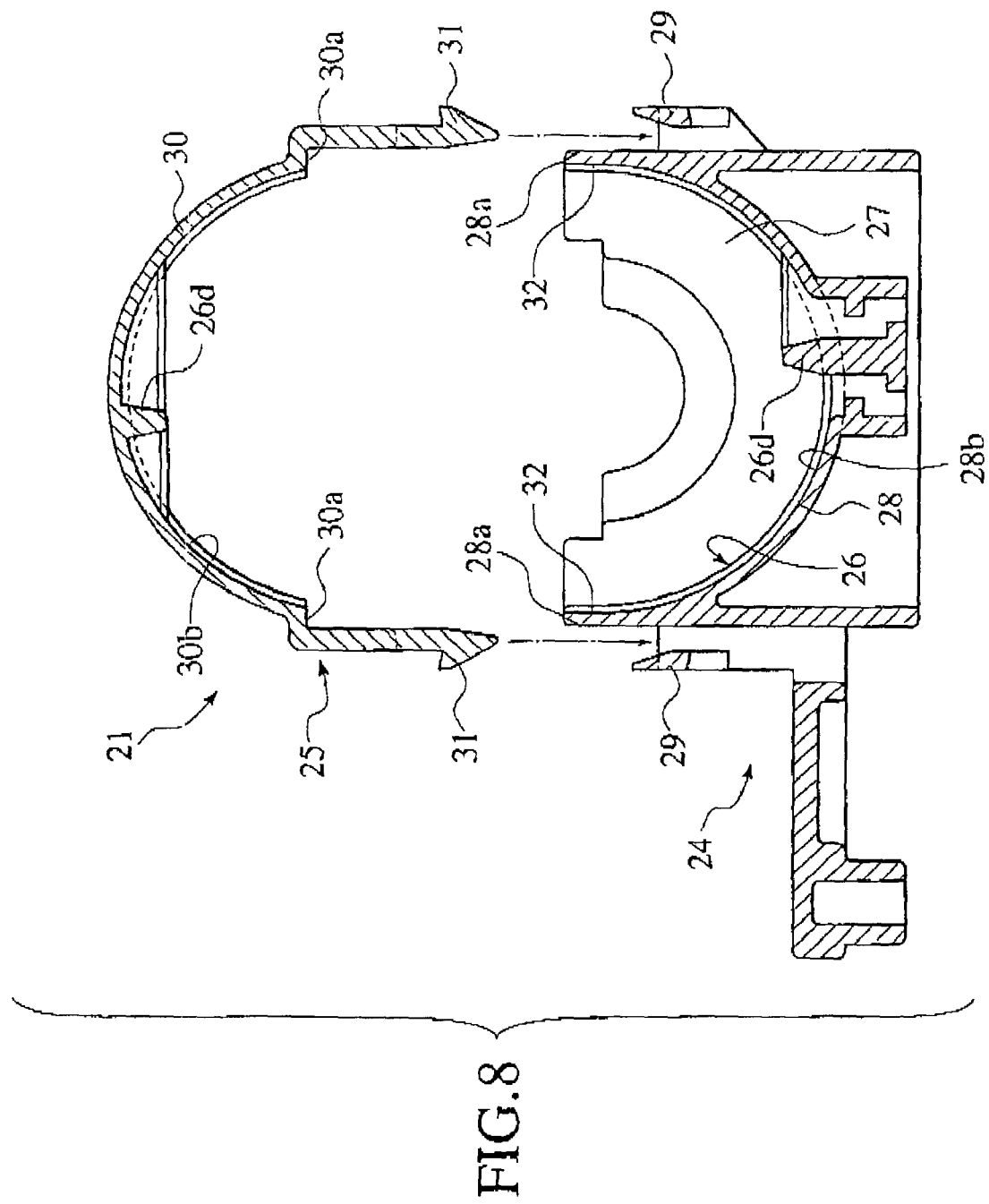
FIG. 8 is an exploded cross sectional view of an outer fixing body according to the embodiment of the present invention.

Moreover, as shown in FIGS. 6 and 8, frame-like lock arm receiving portions 29, 29 functioning as a lock means are provided on both side surfaces of the lower reception case portion 28, and hook-shaped lock arm portions 31, 31 functioning as the lock means are provided on both side surfaces of the upper case reception portion 30. The lock arm portions 31 are locked with the lock arm receiving portions 29, whereby the cover 25 is firmly fixed to the base member 24.

Figure 9:
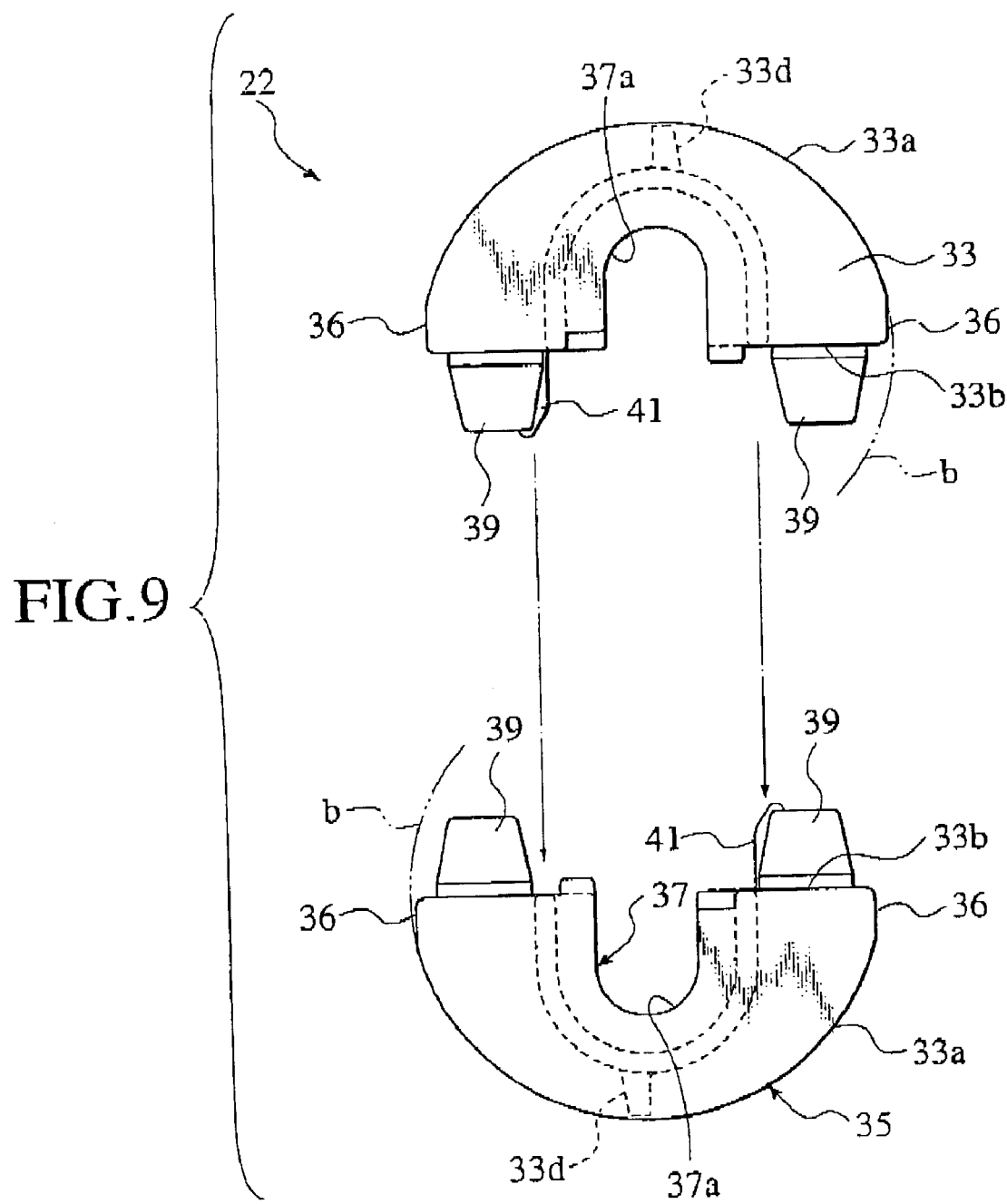
FIG. 9 is an exploded front elevational view of an inner rotary body according to the embodiment of the present invention.
Figure 10:
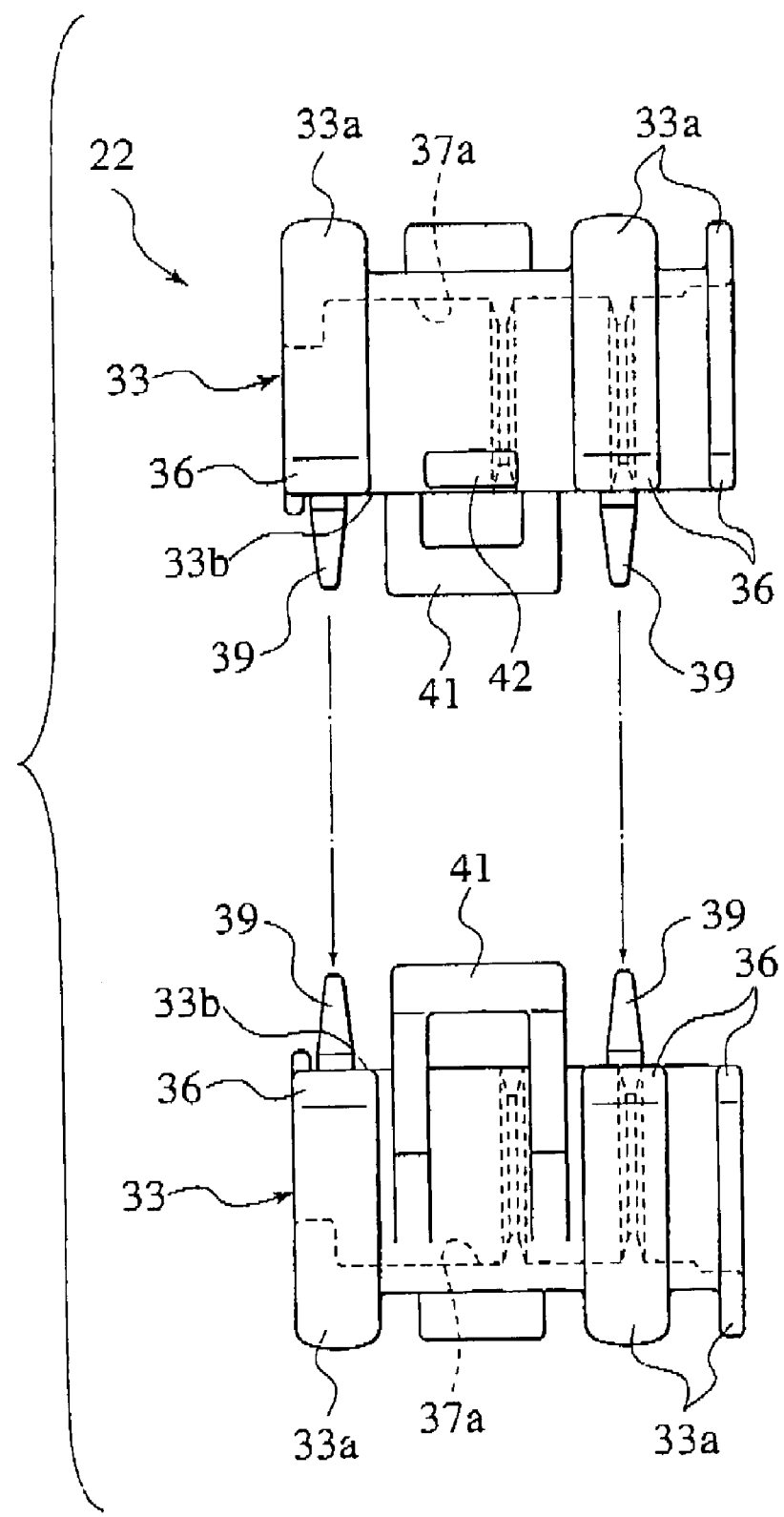
FIG. 10 is an exploded side elevational view of the inner rotary body according to the embodiment of the present invention.

As shown in FIGS. 6 and 9 to 11, the inner rotary body 22 is composed of a pair of divided rotary members 33, 33 each having round arch surface 33a on an outer periphery thereof. Then, one divided rotary member 33 is assembled onto the other divided rotary member 33 by butting a butt surface 33b of one divided rotary member 33 against a butt surface 33b of the other divided rotary member 33. A substantially round outer peripheral sliding surface 35 is formed by the round arch surfaces 33a, 33a of two assembled divided rotary members 33, 33. Accordingly, the inner rotary body 22 has an outer peripheral sliding surface 35 at three positions thereon. A cut surface 36, as shown in FIG. 9, retracting inside from a rotation locus b of the round arch surface 33a in the divide rotary member 33 is formed in each end portion of the round arch surface 33a in the divided rotary member 33. The cut surface 36 is formed as a flat surface obtained by cutting the round arch surface 33a in a perpendicular direction to the butt surface 33b, in the end portion of the round arch surface 33a. Accordingly, the outer peripheral sliding surface 35 is formed in a round shape in the other portions than a boundary portion in which one divided rotary member 33 is assembled onto the other divided rotary member 33, and the outer peripheral sliding surface 35 is formed in a flat shape in the boundary portion in which one divided rotary member 33 is assembled onto the other divided rotary member 33.

A U-shaped groove 37a recessed in a U shape is formed in the divided rotary member 33. The U-shaped grooves 37a, 37a in two divided rotary members 33, 33 face to each other in a state of assembling one divided rotary member 33 onto the other divided rotary member 33, whereby a harness reception port 37 is formed. Further, the inner rotary body 22 holds the corrugated tube 23 containing the wire harness W therein by clamping the corrugated tube 23 in an inner portion of a harness reception chamber 37b positioned in the innermost recess of the harness reception port 37.

Figure 11:
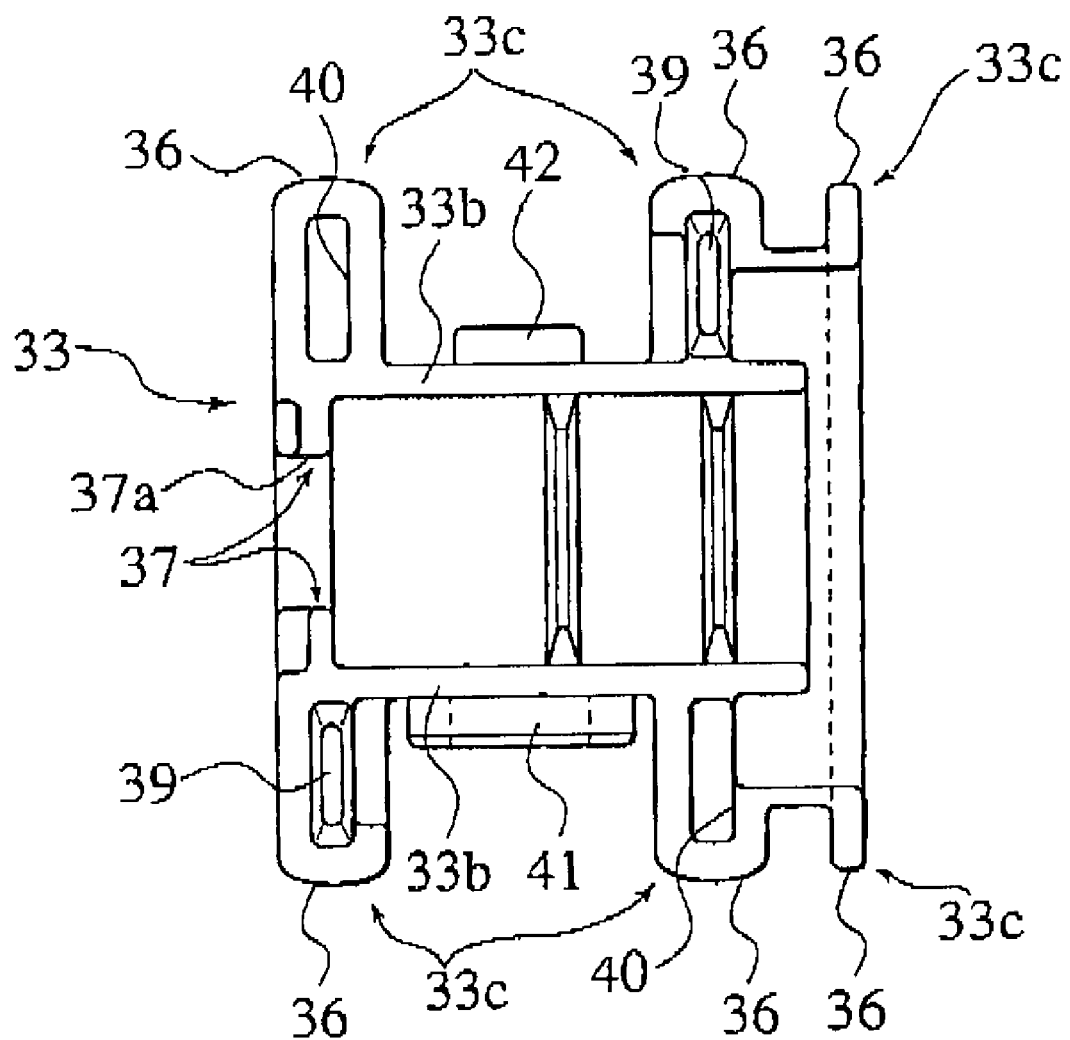
FIG. 11 is a plan view of a divided rotary member according to the embodiment of the present invention.

Further, as shown in FIG. 11, a positioning projection 39 and a positioning groove 40 are provided in each of the butt surfaces 33b, 33b positioned in left and right sides with respect to the harness reception port 37, in the divided rotary member 33. In particular, with respect to the butt surface 33b positioned in a left side of the harness reception port 37, the positioning groove 40 is formed on a top surface of a collar portion 33c existing at the closest position to the harness reception port 37, and the positioning projection 39 is integrally formed in a protruding manner on a top surface of a collar portion 33c existing at the next closest position to the harness reception port 37. Further, with respect to the butt surface 33b positioned in a right side of the harness reception port 37, the positioning projection 39 is integrally formed in a protruding manner on a top surface of a collar portion 33c existing at the closest position to the harness reception port 37, and the positioning groove 40 is formed on a top surface of a collar portion 33c existing at the next closest position to the harness reception port 37. Further, a lock arm receiving portion 42 functioning as a lock means is provided in a protruding manner in an outer wall positioned in a left side of the harness reception port. Further, a lock arm portion 41 functioning as the lock means is provided in an outer wall positioned in a right side of the harness reception port.

Further, at a time of assembling one divided rotary member 33 onto the other divided rotary member 33, one butt surface 33b can be easily and property butted against the other butt surface 33b by inserting the positioning projection 39 of one divided rotary member 33 to the positioning groove 40 of the other divided rotary member 33, and inserting the positioning projection 39 of the other divided rotary member 33 to the positioning groove 40 of one divided rotary member 33. Further, one divided rotary member 33 is securely fixed to the other divided rotary member 33 by locking one lock arm portion 41 with the other lock arm receiving portion 42, and locking the other lock arm portion 41 with one lock arm receiving portion 42, in a state of butting one butt surface 33b against the other butt surface 33b.

In this case, as shown in FIG. 6, the round arch collar portion 33c positioned in one end side of each of the divided rotary members 33, 33 constituting the inner rotary body 22 is received between a pair of round arc collar portions 27c, 27c provided in one end side of the inner rotary chamber 27. Further, a projection 33d provided in a center of the divided rotary member 33 is brought into contact with a projection portion 26d provided on the inner sliding surface 26, whereby the inner rotary body 22 can rotate within a range of an angle of rotation 180 degrees. Further, each of recess portions 23a in the corrugated tube 23 having an oval cross sectional shape (flat type) is engaged with each of a plurality of projection portions 37c provided in the harness reception chamber 37b in each of the divided rotary members 33. The corrugated tube 23 exposes outside the inner rotary body 22, from the projection portion 37c provided in one end side of each of the divided rotary members 33, 33.

In the structure mentioned above, when the wire harness W moves in the inner portion of the corrugated tube 23, whereby a rotation force is applied to the corrugated tube 23, the inner rotary body 22 exposed to this rotation force moves rotating in the inner portion of the outer fixing body 21 in accordance that the outer peripheral sliding surface 35 of the inner rotary body 22 slides, along the inner sliding surface 26 of the outer fixing body 21. As mentioned above, according to the rotation movement of the inner rotary body 22, the corrugated tube 23 is rotatably held to the rotary holder for the corrugated tube 20.

Figure 13:
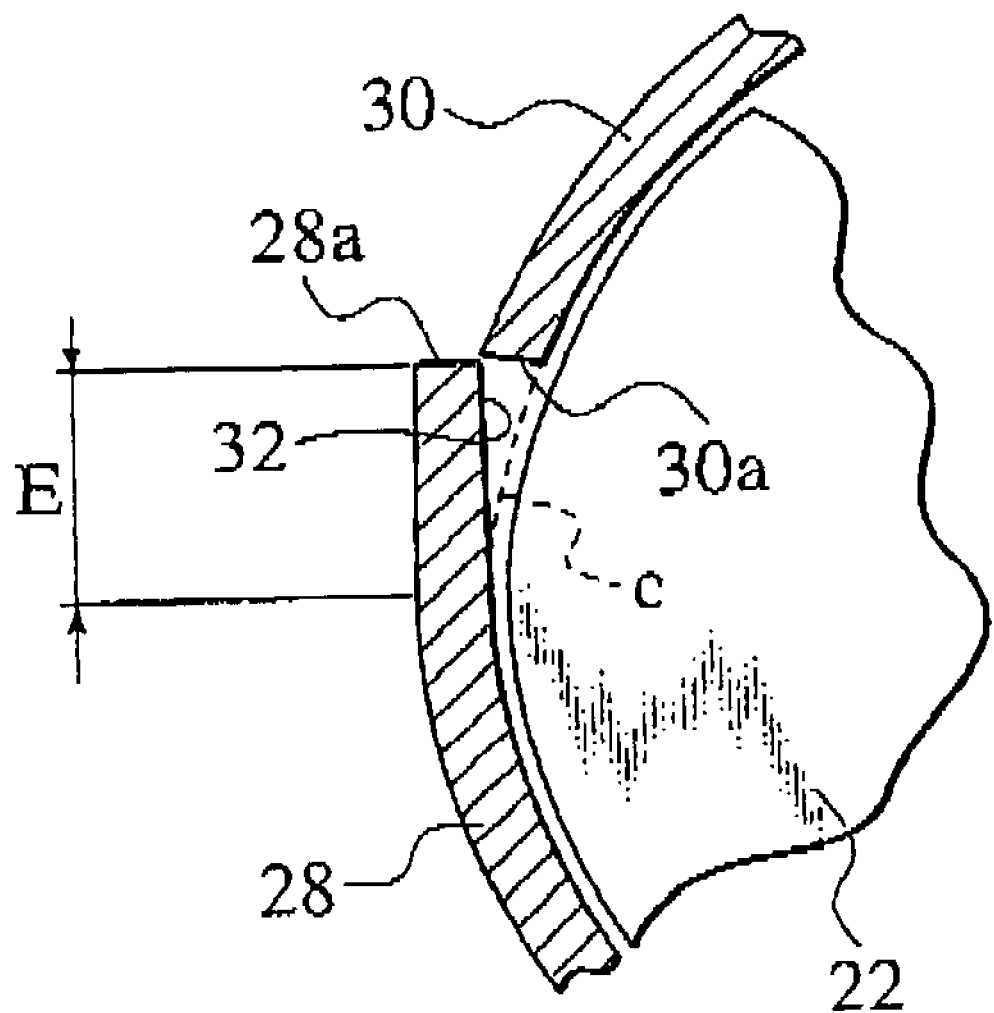
FIG. 13 is a schematic enlarged cross sectional view showing a state in which respective butt surfaces are displaced between a base member and a cover according to the embodiment of the present invention.

However, there is a risk that the butt surface 30a of the cover 25 is displaced from the butt surface 28a of the base member 24, as shown in FIG. 13, due to a failure of the lock arm receiving portion 29 of the base member 24 and the lock arm portion 31 of the cover 25, or due to an outward force applied to the base member 24 and the cover 25 or the like. Once the displacement is generated between the butt surfaces 28a, 30a, a step portion is generated in a portion at which the recessed arch surface 28b of the base member 24 has been smoothly connected to the recessed arch surface 30b of the cover 25. However, since a radius of curvature in the recessed arch surface 30b of the cover 25 is larger than one in the virtual circular locus c of the inner sliding surface 26, the butt surface 30a does not enter into the inner side of the virtual circular locus c of the inner sliding surface 26. Therefore, even when a slight displacement is generated between the butt surfaces 28a and 30a, the inner rotary body 22 can always smoothly move rotating in the inner portion of the outer fixing body 21.

In the present embodiment, since the divided fixing member constituting the outer fixing body 21 is composed of by the base member 24 and the cover 25, the outer fixing body 21 can be assembled by a simple operation of only assembling the cover 25 onto the base member 24.

Further, in the present embodiment. The outer retracting surface 32 is integrally formed in a protruding manner on the recessed arch surface 28b so as to be straightly extended upward. Therefore, the butt surface 30a, 30a of the cover 25 are respectively butted against the butt surface 28a, 28a of the base member 24 at positions above the center of curvature of the recessed arch surface 28b in the base member 24. As a result, even if a slight displacement is generated between the butt surfaces 28a and 30a, the inner rotary body 22 can smoothly move rotating in the inner portion of the outer fixing body 21 without making a lateral width of the outer fixing body 21 large.

Moreover, as shown in FIG. 6, two guides 43, 43 protruding from the upper reception case portion 30 in a direction (the direction Z-axis) in which the corrugated tube 23 extends outward are formed in the cover 25. Therefore, the corrugated tube 23 is in contact with each of the guides 43, 43, whereby it is possible to maintain a change in curvature of the corrugated tube 23 within a fixed value.

That is, a pair of guides 43, 43 for keeping a curvature of the corrugated tube within a fixed value are formed in an introduction side of the cover 25. In addition, a curved wall 43a substantially shaped like circular arc for guiding the corrugated tube 23 in a lateral direction (in the direction X-axis) is integrally formed in an inner side of each of guides 43, 43. A shape between the curved wall 43a and an outer wall of the cover 25 is substantially shaped like a letter V in the cross section. The curved guides 43a, 43a are respectively fitted into guide support portions 24a, 24a which are provided in the introduction side of the base member 24. Therefore, the curved walls 43a, 43a are also formed to extend downward so as to fit into the guide support portions 24a, 24a. Further, a curved wall 43b substantially shaped like circular arc for guiding the corrugated tube 23 in a direction Z-axis is integrally formed between upper ends of a pair of curved walls 43a, 43a. According to the structure mentioned above, even when the corrugated tube 23 largely swings in a lateral direction (in a direction of X-axis) and a vertical direction (in a direction of Y-axis), in the introduction side of the corrugated tube 23, bending of the corrugated tube 23 can be prevented by the curved walls 43a, 43a and the curved wall 43b. Therefore, it is possible to securely prevent the corrugated tube 23 and a plurality of wires constituting the wire harness W from being broken, being disconnected or the like due to a long time use thereof.

Further, in the present invention, there is a risk that the butt surface 33b of one divided rotary member 33 is displaced from the butt surface 33b of the other divided rotary member 33 due to an outward force applied by the corrugated tube 23 held in the inner portion of the inner rotary body 22, and a failure of the lock arm portion 41 and the locked portion 42 provided between a pair of divided rotary members 33, 33. Once the displacement is generated between the butt surfaces 33b, 33b, a step portion 43 is generated in a portion at which the round arch surface 33a of one divided member 33 has been smoothly connected to the round arch surface 33a of the other divided rotary member 33. However, since the cut surface 36 is formed in each end portion of the round arch surface 33a in the divided rotary members 33, the cut surface 36 does not protrude outside the rotation locus b of the outer peripheral sliding surface 35, in the portion at which the divided rotary members 33, 33 are butted against each other. Even if the step portion is generated, the outer peripheral sliding surface 35 substantially has the same effect that radius of rotation of the inner rotary body 22 is slightly increased. Therefore, even when the displacement is generated between the butt surfaces 33b, 33b of a pair of divided rotary members 33, 33, the inner rotary body 22 can always smoothly rotate along the inner sliding surface 26 of the outer fixing body 21.

In this case, in the present embodiment, the butt surface 28a of the base member 24 and the butt surface 30a of the cover 25 are both arranged at the positions above the center of the inner sliding surface 26. However, they may be arranged at positions below the center of the inner sliding surface 26. Further, the outer fixing body 21 is composed of two members, however, may be composed of three or more divided fixing members. Still further, the corrugated tube 23 should not be confined to those of the oval cross sectional shape, but can be those of a tubular shape having a circular cross sectional shape. The corrugated tube 23 should not also be confined to those of the undulate surface, but can be those of a flat surface.

What is claimed is:

1. A rotary holder for a corrugated tube comprising:
   an outer fixed body having two or more members and an inner rotary chamber, each of the members having a recessed arched surface on an inner periphery thereof that, when the members are assembled together, form a substantially round inner sliding surface that surrounds the inner rotary chamber; and
   an inner rotary body having an outer peripheral sliding surface configured to slide along the substantially round inner sliding surface of the outer fixed body, the inner rotary body also being configured to receive the corrugated tube;
   wherein the outer peripheral sliding surface is configured to slide smoothly along the substantially round inner sliding surface even when the assembled members are misaligned,
   wherein at least one of the members includes outer retracting surfaces disposed on the ends of the recessed arch surface and positioned outside a virtual circular locus of the recessed arch surface.

2. The rotary holder of claim 1, wherein each of the recessed arched surfaces have substantially the same length as the outer retracting surfaces.

3. The rotary holder of claim 1, wherein the outer retracting surface extends toward an upper side from a center of the substantially round inner sliding surface.

4. The rotary holder of claim 1, wherein one member is a cover and another member is a base member.

5. The rotary holder of claim 1, wherein the outer fixed body further comprises a guide configured to preserve a curvature of the corrugated tube.

6. The rotary holder of claim 1, wherein the outer fixed body further comprises a curved wall configured to guide the corrugated tube.

7. The rotary holder of claim 1, wherein each member further comprises a butt surface configured to mate with the butt surface of another member when the members are assembled together,
   wherein the outer peripheral sliding surface is configured to slide smoothly along the substantially round inner sliding surface even when the butt surfaces are misaligned.

8. The rotary holder of claim 7, wherein a butt surface of one member mates with a butt surface of another member above a center of the substantially round inner surface.

9. A rotary holder for a corrugated tube comprising:
   an outer fixed body having two or more members and an inner rotary chamber, each of the members having a recessed arched surface on an inner periphery thereof that, when the members are assembled together, form a substantially round inner sliding surface that surrounds the inner rotary chamber; and
   an inner rotary body having an outer peripheral sliding surface configured to slide along the substantially round inner sliding surface of the outer fixed body, the inner rotary body also being configured to receive the corrugated tube;
   wherein the outer peripheral sliding surface is configured to slide smoothly along the substantially round inner sliding surface even when the assembled members are misaligned,
   wherein a cut portion of the outer peripheral sliding surface is disposed radially inward from a rotation locus of the outer peripheral sliding surface.

10. The rotary holder of claim 9, wherein the cut portion further accommodates the smooth sliding of the outer peripheral sliding surface along the substantially round inner sliding surface even when the assembled members are misaligned.

11. The rotary holder of claim 9, wherein the cut portion is disposed substantially adjacent to a portion of the outer fixed body where two butt surfaces mate.

* * * * *